United States Patent [19]
Wright

[11] Patent Number: 5,703,925
[45] Date of Patent: Dec. 30, 1997

[54] X-RAY CASSETTE SUPPORT APPARATUS

[75] Inventor: Howard Stanley Wright, New Plymouth, New Zealand

[73] Assignee: Howard Wright Limited, New Plymouth, New Zealand

[21] Appl. No.: 695,852

[22] Filed: Aug. 9, 1996

[30]  Foreign Application Priority Data

Aug. 10, 1995  [NZ]  New Zealand .......................... 272755

[51] Int. Cl.⁶ .................................................. G03B 42/02
[52] U.S. Cl. ........................... 378/181; 378/167; 378/177
[58] Field of Search ..................................... 378/167, 169, 378/170, 172, 173, 174, 175, 181, 182, 177

[56]   References Cited

U.S. PATENT DOCUMENTS 3,826,922  7/1974  Ingles ................................. 378/167

*Primary Examiner*—Don Wong
*Attorney, Agent, or Firm*—Oblon, Spivak, McClelland, Maier & Neustadt, P.C.

[57]   ABSTRACT

A support for an x-ray cassette which enables an x-ray cassette to be located and moved beneath a patient support surface. The support includes a spade on which an x-ray cassette can be located such as to be positioned beneath the patient support surface. The spade is located on a sliding surface. A handle permits manipulation of the cassette spade over the sliding surface. A raising and lowering mechanism controlled by an operating handle enables the cassette to be raised upwardly to locate closely beneath the patient support surface. An indicator enables the position of the spade to be determined. The indicator is mounted by a post which is engageable with frame to limit the extent by which the spade can be moved transversely in one direction with respect to the patient support surface.

17 Claims, 3 Drawing Sheets

X-RAY CASSETTE SUPPORT APPARATUS

BACKGROUND OF THE INVENTION

1. Field of the Invention

This invention relates to an x-ray cassette support apparatus.

2. Discussion of the Background

Successful diagnostic x-ray pictures require that the cassette containing the film be accurately placed under the appropriate part of the patient's body and that there be minimal space between film and subject. The most common method of locating the cassette under the desired part of the patient's anatomy involves a pair of spaced apart rails placed some distance below a radiolucent patient support surface and a sleigh thereon that is able to slide the length of the support surface. The film cassette is placed on the sleigh at the end of the support surface and slid along the rails so as to be located directly under that part of the body to be x-rayed. Sometimes the sleigh is provided with an auxiliary track at 90° to the main rails thus allowing for side loading rather than end placement of the cassette.

Considerable skill is required by the radiographer in order to achieve accurate placement of the film under the subject. Visual judgement is necessary and this is not always successful especially if the subject body is contorted and not aligned with the sleigh underneath.

SUMMARY OF THE INVENTION

The object of the present invention is to provide an x-ray cassette support apparatus which permits easy placement and positioning of an x-ray cassette under a patient support surface.

A further object is to provide an x-ray cassette support apparatus which reduces the requirement for skilled visual judgement for placement of the cassette beneath a patient support surface.

Broadly in one aspect of the invention there is provided a support for an x-ray cassette comprising a sliding surface which, in use, is locatable beneath a patient support surface, an x-ray cassette support surface adapted for sliding movement over the sliding surface and handle means for manipulation of the cassette support surface over the sliding surface.

In the preferred form of the invention there is provided indicator means for, in use, indicating above the patient support surface the position of the cassette support surface below the patient support surface. Preferably there is also included stop means for preventing movement of the cassette support surface along a direction of movement over the sliding surface upon the cassette support surface reaching a predetermined position.

According to a preferred form of the invention there is provided a raising and lowering mechanism whereby the position of the cassette support surface can be raised and lowered relative to the sliding surface.

DESCRIPTION OF THE PREFERRED EMBODIMENTS

Figure 1:
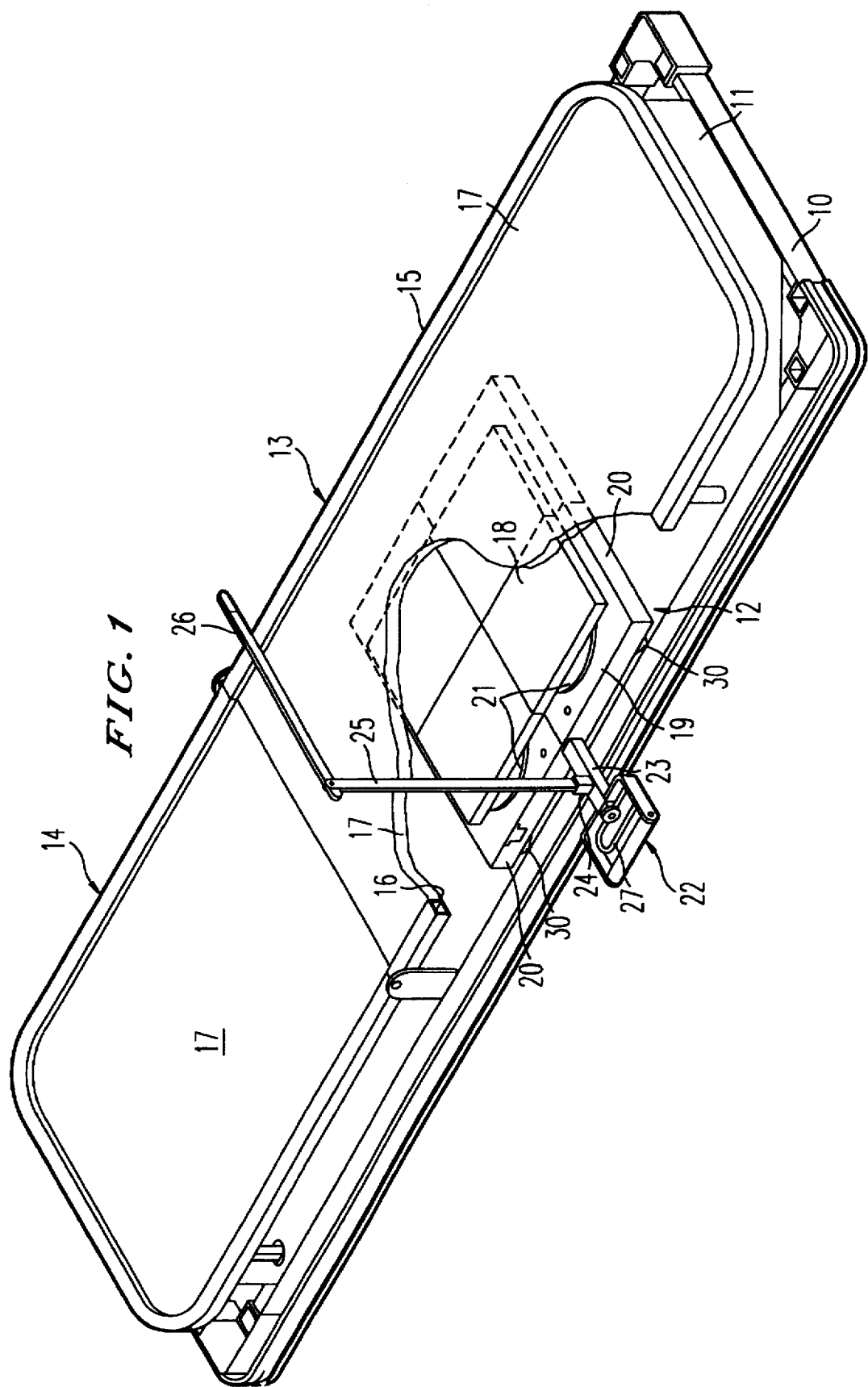
FIG. 1 is a perspective cut-away view of a patient support platform in conjunction with apparatus according to the present invention for support and positioning of x-ray cassette.
Figure 2:
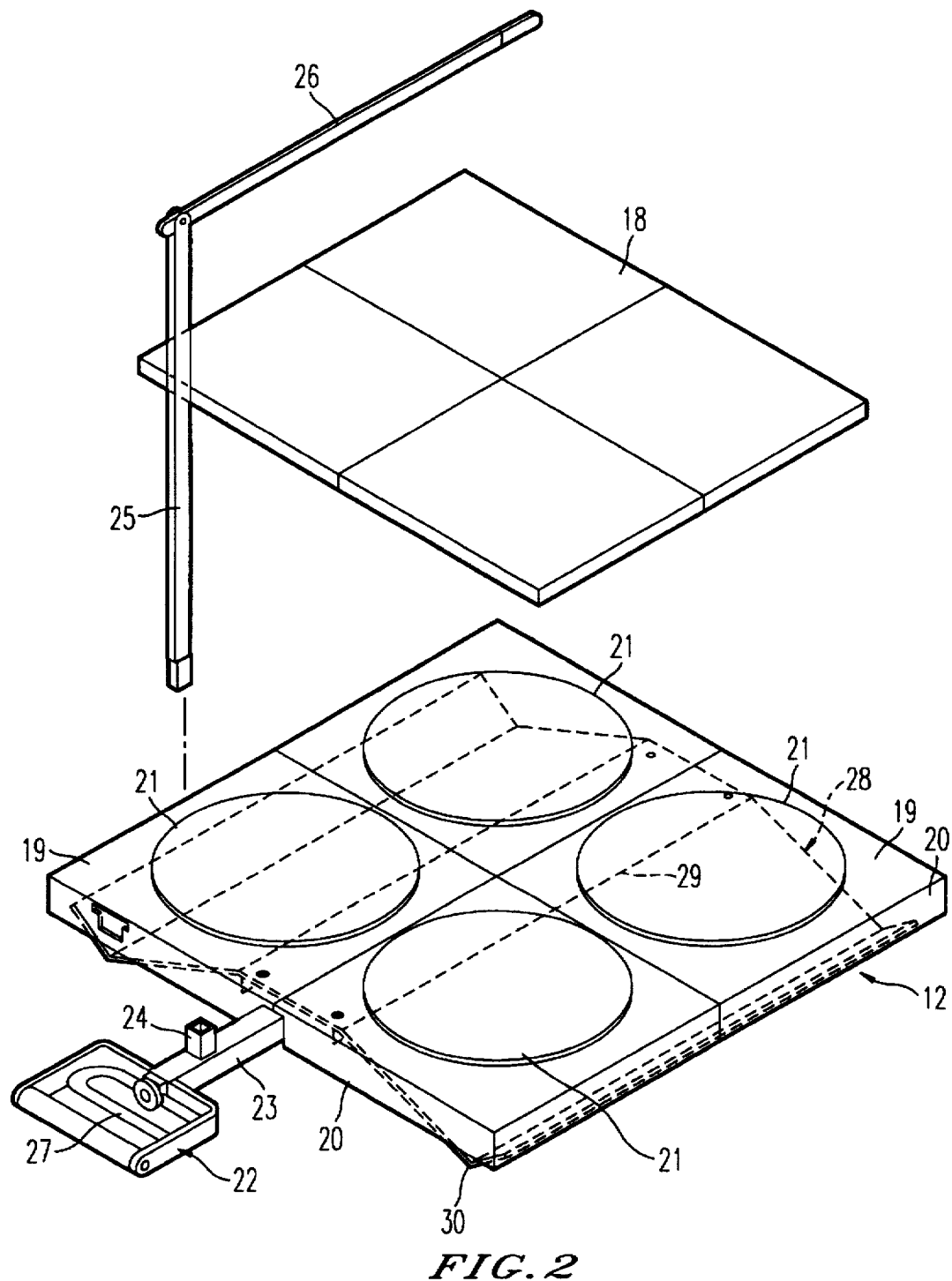
FIG. 2 is a phantom perspective view of the spade construction (as hereinafter described) with associated pointer and cassette elevated thereabove.
Figure 3:
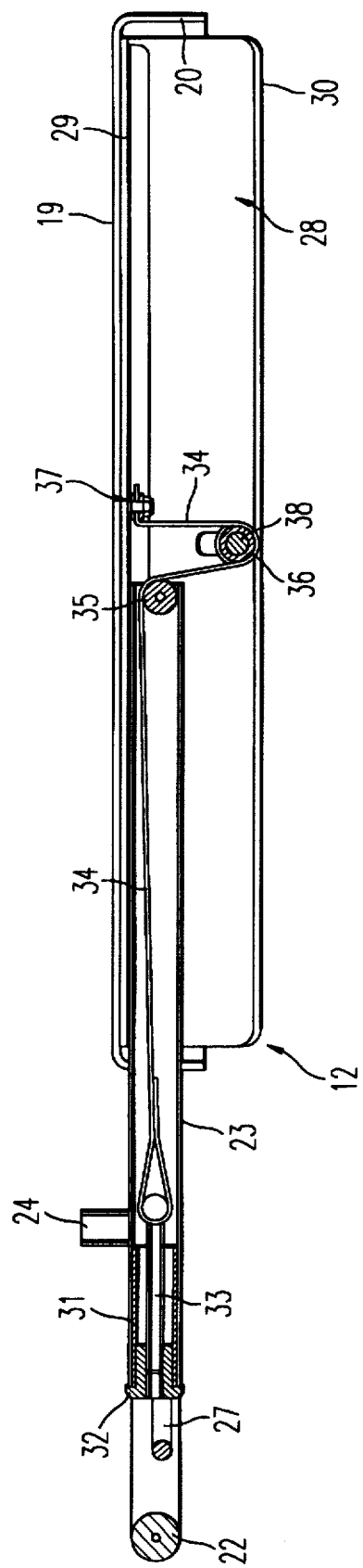
FIG. 3 is a sectional illustration of the spade showing a rise and fall mechanism thereof.

According to the present invention there is provided a trolley frame 10 which supports within its confines a sheet material 11. This sheet material 11 presents a smooth flush surface on which an object (e.g. the "spade" 12 as hereinafter described) can be easily slid in any direction.

Elevated above the trolley frame 10 and sheet material 11 (by approximately 75 mm) is a patient support surface. This support surface can be divided into sections though typically, as illustrated, there will be a major section 13 to support the lower body of a patient and a pivoted section 14 to form a back rest. As illustrated, the support platform may be formed by a metal frame 15 that has provision for articulation of the back rest portion 14 and fixing means 16 for the fixing of panels 17 of radiolucent material. The radiolucent panels are preferably rebated into the fixing means 16 so that the underside of the support platform is smooth and flush.

A movable object, which for the purposes of description will be called a spade 12, is used to place an x-ray cassette 18 in the required position under the support surface and therefore under a patient lying upon the support surface.

The spade 12 is generally a square panel 19, preferably of lightweight plastics material, with downwardly projecting stiffening flanges 20 on all four sides. The panel 19 is dimensioned so as to accept the usually rectangular cassettes 18 in any direction of placement. Located on the upper surface of panel 19 are four sections 21 of rubber or foam material placed in a "four square" arrangement that indicates dead center and inhibits movement of any cassette placed thereon.

To facilitate movement of the spade 12 there is provided a handle 22 which projects from one side of the spade. As can be seen in FIG. 1 the handle 22 permits placement of the cassettes located on panel 19 from beyond the perimeter of the patient support surface. This projecting handle not only provides the means of locating the cassette but (as hereinafter described) also controlling a degree of vertical movement of panel 19 relative to the patient support surface.

The handle 22 is mounted by a tubular (preferably square or rectangular cross section) member 23 which extends through a flange 20 beneath the panel 19 to terminate adjacent the center of the panel 19. A socket 24 is located on the upper surface of member 23 and a post 25 is locatable therein at its lower end. Hinged to the upper end of post 25 is a bar 26, this bar aligning with the spade platform 19 and marked to indicate dead center.

Upon the spade 12 being located beneath the patient support center the post 25 engages with the side extremity of the patient support surface when the spade reaches dead center and therefore forms a physical stop upon dead center being reached. The bar 26 acts as a pointer as disposed over the patient's body. The pointer defines the alignment of the spade 12 and dead center of the spade platform surface.

Hinging of the alignment bar 26 allows an amount of movement over patients of different mass and also allows it to be folded flat with respect to the post 25 and stored within the spade platform.

As mentioned above the spade platform 19 is able to be moved vertically relative to the patient support surface. This vertical movement provides a low position for loading and placement of the cassette 18 and a high position that presses the cassette 18 upwards into contact with the underside of the patient support surface.

This vertical movement is achieved by squeezing a lever 27 which is contained in the spade handle 22. Upon the lever being squeezed the platform 19 moves to the low position for loading and placement of the cassette and upon releasing the lever 27 the platform 19 is raised to the maximum height. In the preferred form of the invention this upward movement is achieved by a spring action though there are many different ways which will be apparent to those skilled in the art to achieve a raising and lowering movement of the platform 19. For example, such movement can be achieved through the use of levers or screw threads.

In the preferred embodiment as illustrated a sheet 28 of a suitable plastics material such as ABS is formed into a generally W shape with the center peak of the W being flattened to form a flat surface 29. This flat surface 29 is fixed directly to the underside of the spade platform 19. As shown an inverted channel shaped member can be used to sandwich the flat surface with the underside of platform 19. The two low points 30 of the W shape protrude beyond the bottom terminal edges of the flanges 20 of the spade platform and thus support the platform in its upper or raised position. The inherent flexibility of the plastics material from which the W shape is formed is used as the upward spring force.

To achieve lowering of the spade platform 19 the lever 27 is connected to a tubular member 31 that is slideable within the main square tube 23 described above. A shoulder formed by an end cap 32 provides an end stop to limit the extent by which tube 31 can slide into the main tube 23.

An anchor 33 coupled to the sliding tube 31 retains a tape 34 which passes over a first roller 35 located at the inner end of the main tube 23. The tape passes over roller 35 and around roller 36 to an anchorage 37 on the underside of platform 19. Roller 36 is located by a bar 38 which spans the distance from one active leg of the W shaped member to the other.

By squeezing on the lever 27 as previously described a two to one leverage is exerted on bar 38 so that the two low points of the active legs of the W shaped member are raised half the distance that the handle 27 is moved. In practice a vertical movement of 10 mm of the spade platform provides for easy placement of the cassette 18 on the spade and direct contact with the underside of the patient support surface.

In an alternative arrangement a simpler form of the spade 12 can be utilized that is identical to that described and illustrated but without the ability to move vertically. In this instance an air space is allowed between the cassette 18 and the patient support surface.

The support apparatus for a cassette as described herein provides an improved method of cassette placement that has the following desirable attributes:

It allows rapid placement from the sides or ends of the patient support surface.

It changes the visual element of placement from indirect (ie under the support surface) to directly on the patient's body by virtue of the pointer located above the patient's body.

It totally eliminates any surface space between the cassette and the underside of the patient support surface.

It secures the cassette in the preferred position.

What is claimed is:

1. A support for an x-ray cassette comprising a sliding surface which, in use, is locatable beneath a patient support surface, an x-ray cassette support surface, said support surface being slidable in more than one direction over the sliding surface and a handle for manipulation of the cassette support surface over the sliding surface.

2. The support according to claim 1, which comprises an indicator mounted so as to be movable over and above the patient support surface in response to movement of the cassette support surface to thereby indicate the position of the cassette support surface below the patient support surface.

3. The support according to claim 1 which comprises a stop member preventing movement of the cassette support surface along a direction of movement over the sliding surface upon the cassette support surface reaching a predetermined position.

4. The support according to claim 2 wherein the indicator includes a post carried by said handle, said post having an indicator arm which extends above the cassette support surface and indicates by a suitable marking thereon a part of the cassette support surface.

5. The support according to claim 4 wherein the part of the cassette support surface indicated by the indicator comprises a center portion thereof.

6. The support according to claim 4 wherein the post comprises a stop preventing movement of the cassette support surface along a direction of movement over the sliding surface upon the cassette support surface reaching a predetermined position.

7. The support according to claim 1 wherein the cassette support surface includes a movement inhibiting mechanism inhibiting movement of an x-ray cassette placed on the x-ray cassette support surface.

8. A support for an x-ray cassette which comprises:
   a sliding surface which, in use, is positioned beneath a patient support surface,
   an x-ray cassette support surface which is slidable over the sliding surface,
   a mechanism for manipulating the cassette support surface over the sliding surface, and
   a raising and lowering mechanism which raises and lowers the cassette support surface relative to the sliding surface.

9. The support according to claim 8 wherein the raising and lowering mechanism includes an operating mechanism which comprises part of said manipulation mechanism.

10. The support according to claim 8 wherein the raising and lowering mechanism includes a pair of leg elements which are inclined downwardly and away from one another, a connecting member located therebetween, and a moving mechanism for moving said connecting member against the action of a biasing device to lower the cassette support surface relative to the sliding surface.

11. The support according to claim 10 which comprises a pull handle wherein the biasing device comprises a resilient characteristic of the leg elements, and the lifting mechanism comprises a tape anchored to the x-ray cassette support surface, said tape being engaged with said connecting member and extending over a guide to said pull handle.

12. The support according to claim 10 wherein the leg elements comprise a panel of resilient material bent into a substantially W shape, a center of the W shape having mounted thereon the cassette support surface such that said cassette support surface is located above the sliding support surface.

13. The support according to claim 12 wherein the connecting member comprises a shaft mounted between the leg elements, said tape being passed over a first roller an the shaft and a second roller which forms the guide, the pull handle being mounted with but movable relative to said handle.

14. A support for an x-ray cassette, comprising;

a patient support surface;

a sliding surface which, in use, is positioned beneath said patient support surface;

an x-ray cassette support surface which is slidable in any direction over the sliding surface, a mechanism for manipulation of the cassette support surface over the sliding surface indicator for indicating at a position located above the patient support surface the position of the cassette support surface below the patient support surface, and a stop mechanism preventing movement of the cassette support surface along a direction of movement over the sliding surface upon the cassette support surface reaching a predetermined position.

15. The support according to claim 14 which comprises a raising and lowering mechanism raising and lowering the position of the cassette support surface relative to the sliding surface.

16. The support according to claim 14 or 15 wherein the cassette support surface includes a movement inhibiting mechanism inhibiting movement of an x-ray cassette placed on the x-ray cassette support surface.

17. A support for an X-ray cassette, comprising:

a sliding surface which is positioned beneath a patient support surface;

an x-ray cassette supporting surface which is slidable over the sliding surface;

a mechanism for manipulation of the cassette support surface over the sliding surface indicator for indicating at a position located above the patient support surface the position of the cassette support surface below the patient support surface, and a stop mechanism preventing movement of the cassette support surface along a direction of movement over the sliding surface upon the cassette support surface reaching a predetermined position; and a raising and lowering mechanism raising and lowering the position of the cassette support surface relative to the sliding surface.

* * * * *